United States Patent [19]

Kawabata et al.

[11] Patent Number: 4,823,251
[45] Date of Patent: Apr. 18, 1989

[54] CONTROLLER FOR INSTANTANEOUS OUTPUT CURRENT AND/OR VOLTAGE OF 3-PHASE CONVERTER

[75] Inventors: Takao Kawabata; Takeshi Miyashita; Yushin Yamamoto, all of Hyogo, Japan

[73] Assignee: Mitsubishi Denki Kabushiki Kaisha, Tokyo, Japan

[21] Appl. No.: 155,049

[22] Filed: Feb. 11, 1988

[30] Foreign Application Priority Data

Jul. 28, 1987 [JP] Japan ................................ 61-189352

[51] Int. Cl.$^4$ ............................................. H02M 7/68
[52] U.S. Cl. ......................................... 363/95; 363/96; 363/98
[58] Field of Search ......................... 363/95, 96, 97, 98

[56] References Cited

U.S. PATENT DOCUMENTS 4,367,522  1/1983  Forstbauer .............................. 363/96
4,751,447  6/1988  Okachi .................................. 363/97

OTHER PUBLICATIONS

Y. Sekino et al., "Inverter Output Voltage Waveform Closed-Loop Control Technique", Oct. 18-21, 1983, pp. 205-212.

Japanese Institute of Electrical Engineering, "Decoupled Control of Instantaneous Reactive Power Compensation by PWM Power Converter", JIEE Technical Meeting of Semiconductor Power Converter, SPC-8-4-80, 1984, pp. 51-60.

Primary Examiner—Patrick R. Salce
Assistant Examiner—Jeffrey Sterrett
Attorney, Agent, or Firm—Bernard, Rothwell & Brown

[57] ABSTRACT

A control circuit for a 3-phase converter which is provided to control the 3-phase converter having an output filter provided with a current minor loop which controls an instantaneous value of the output current on the basis of a feedback signal obtained by converting the output current of the converter to d axis and q axis components by a synchronous revolutional coordinate system and a voltage major loop which controls the instantaneous value of the output voltage on the basis of a feedback signal obtained by converting the output voltage of the output filter to the d axis and q axis components; and realizes protection from overcurrent due to short-circuit of output.

12 Claims, 13 Drawing Sheets

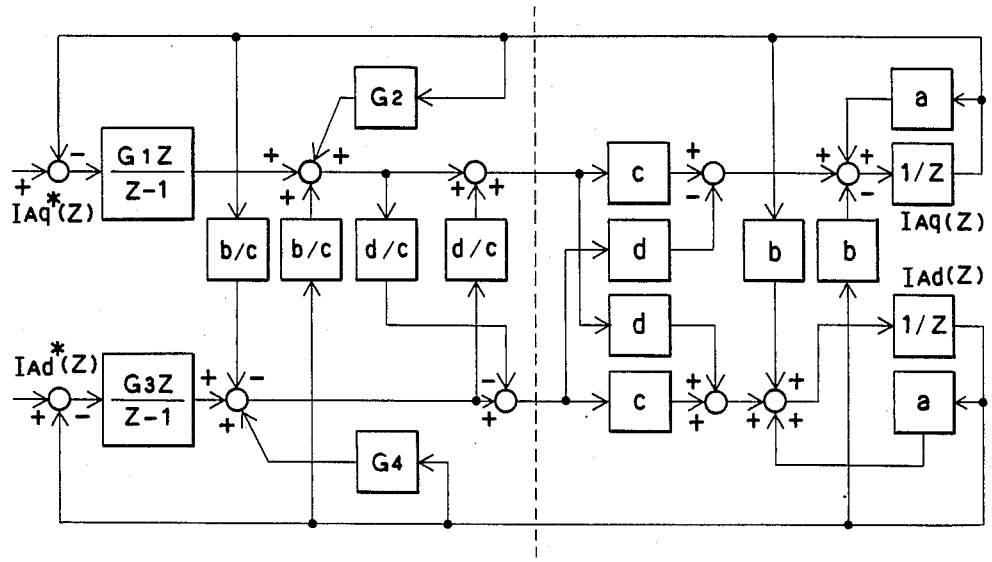
F I G. 8
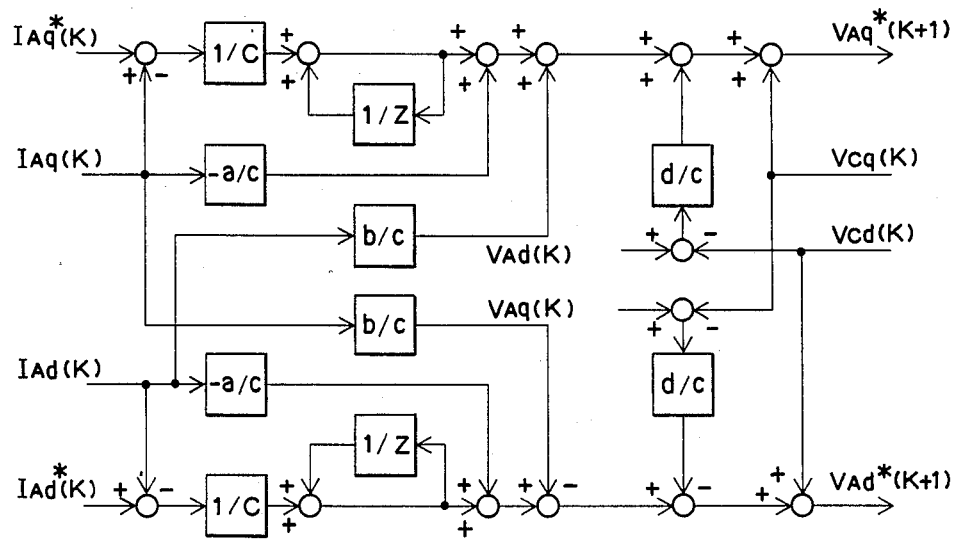
F I G. 9

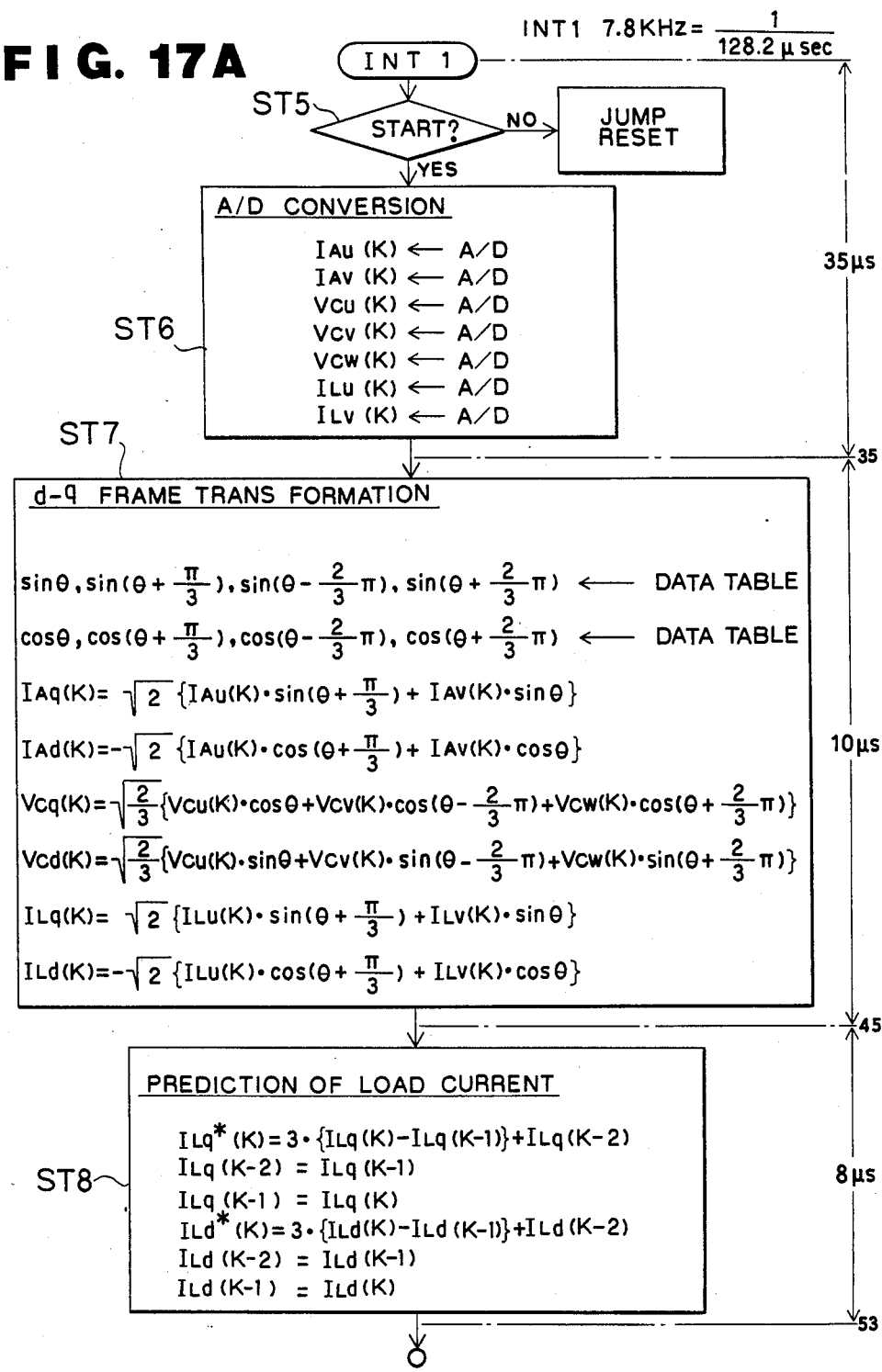

CONTROLLER FOR INSTANTANEOUS OUTPUT CURRENT AND/OR VOLTAGE OF 3-PHASE CONVERTER

BACKGROUND OF THE INVENTION

1. Field of the Invention

The present invention relates to a high performance controller for a 3-phase converter to be used for UPS, VVVF, active filter, high power factor converter, or vector control using a cycloconverter.

2. Description of the Prior Art

FIG. 1 is a block diagram of an inverter controller of the prior art disclosed, for example, in the Intelec Transaction PP. 205-212 (Oct. 18-21, 1983, Tokyo) entitled "Inverter Output Voltage Waveform Closed-Loop Control Technique". In this figure, 1 is an inverter main circuit; 2, 3 are a reactor and a capacitor, respectively, forming an AC filter; 4 is a DC power supply; 5 is a load; 6 is a control circuit of inverter main circuit 1. This control circuit 6 is composed of an AC (sine wave) reference voltage generator 7, a subtractor 8 which subtracts a feedback voltage from the output of the reference voltage generator 7, an amplifier 9 and a pulse width modulation (PWM) circuit 10, which is formed by a comparator 11 and a carrier generator 12. A numeral 13 is a drive circuit which operates the inverter main circuit 1 on the basis of an output of the carrier generator 12. Operations are then explained hereunder.

First, a sinusoidal output voltage is obtained across the terminals of capacitor 3 in compliance with the control output of the PWM circuit 10 (the control system is explained on the image of analog system). Meanwhile, an output of the PWM circuit 10 controls the switching of inverter main circuit 1 through the amplifier 9 so that the sine wave reference of the AC reference voltage generator 7 matches the output voltage thereof. Moreover, the PWM circuit 10 is formed by a triangular carrier generator 12 and a comparator 11 and determines the timing of switching operation of PWM in accordance with the sinusoidal signal obtained by amplifying a voltage deviation in the amplifier 9. In actuality, since the amplifier 9 has only finite gain from the point of view of stability of operation, an output voltage of the inverter follows the reference voltage under the condition that an output voltage of inverter has little deviation from the reference voltage.

Next, a second example of the prior art will be explained with reference to FIG. 2. This figure is the same figure as FIG. 6 on page 54 of a paper entitled "Decoupling Control of Instantaneous Reactive Power Compensation by PWM Power Converter" which was presented on the conference record of the JIEE Technical Meeting of Semiconductor Power Converter issued in 1984 as paper number SPC-84-80. In FIG. 2, for the sake of convenience of explanation, the same graphical symbols as those of other figures of this application are used. The control circuit of FIG. 2 generates the signal which is obtained by amplifying a difference between the current commands Id*, Iq* of the d and q axes and the current feedback signals Id, Iq of the d, q axes with the gain K. The d axis indicates the perpendicular axis element in the current vector while the q axis indicates the lateral axis element.

Moreover, a signal is obtained by multiplying the angular velocity ω of output frequency of the converter and output inductance of $L_s$ to the feedback signals Id, Iq of the d, q axes and the current components of d, q axes are prevented from interfering mutually with the other phases, by subtracting the q axis element of above signal from the inverter voltage command of d axis and adding the d axis element of the above signal to the inverter voltage command of q axis.

Since the control circuit of the converter of the prior art is formed as explained above, the inverter operates as a voltage source having very low impedance when it is observed from the output side. Therefore, if short-circuit trouble occurs in the load side of the inverter or if in-rush current of a transformer flows, an excessive output current flows, resulting in a problem that the overcurrent condition is easily generated and thereby protection becomes difficult. In addition, if a load such as a rectifier which generates a lot of harmonics is connected in the output side, the voltage deviation increases as explained previously, and the control operation is carried out after such deviation appears, thereby resulting in a problem that a voltage deviation is inevitably left in compliance with load harmonics.

Moreover, the decoupling method of the 3-phase inverter disclosed in the material of the JIEE Technical Meeting Semiconductor Power Converter SPC-84-80 gives the decoupling method in the control circuit used in the continuous system. The decoupling method in the sample control system of the prior art has been realized under the assumption that the sampling time is sufficiently short. Namely, the long sampling time has brought about a problem that decoupling control cannot be performed completely.

SUMMARY OF THE INVENTION

The present invention has been proposed to eliminate the problems explained previously and therefore it is an object of the present invention to provide a controller of the converter which assures good transient response of the output voltage of the converter, supplies a sinusoidal voltage of less distortion to both linear load and nonlinear load and easily provides reliable protection against output overcurrent.

In addition, it is also an object of the present invention to provide a decoupled control system in the sample control system of a 3-phase converter such as an inverter, which presents an algorithm for realizing accurate decoupling method even in case of long sampling time and also ensures excellent control characteristics by a microprocessor.

In order to attain such objects, a current minor loop is provided to limit output overcurrent. By limiting the current command value by a limiter, output overcurrent can be easily avoided.

And then, a current command value which is necessary to get sinusoidal output voltage is given to this current minor loop.

The current command value is obtained, as will be explained later, utilizing information concerning load current, output current of the converter and deviation of the output voltage from the reference voltage. Therefore an overcurrent due to short-circuit of output is always protected by a current limiting function of the minor loop which instantly limits output overcurrent.

Namely, the present invention provides a means to form a control circuit on the d and q axes using the synchronous revolutional 3-phase coordinates system.

Moreover, the present invention also provides, as a second invention, a novel decoupling control means which realizes formation of the control system for sampled data control.

BRIEF DESCRIPTION OF THE DRAWINGS

FIG. 8 is a block diagram of a current control system as an embodiment of the present invention;

FIG. 9 is a block diagram of a current control circuit as another embodiment of the present invention;

DETAILED DESCRIPTION OF THE PREFERRED EMBODIMENT

Figure 1:
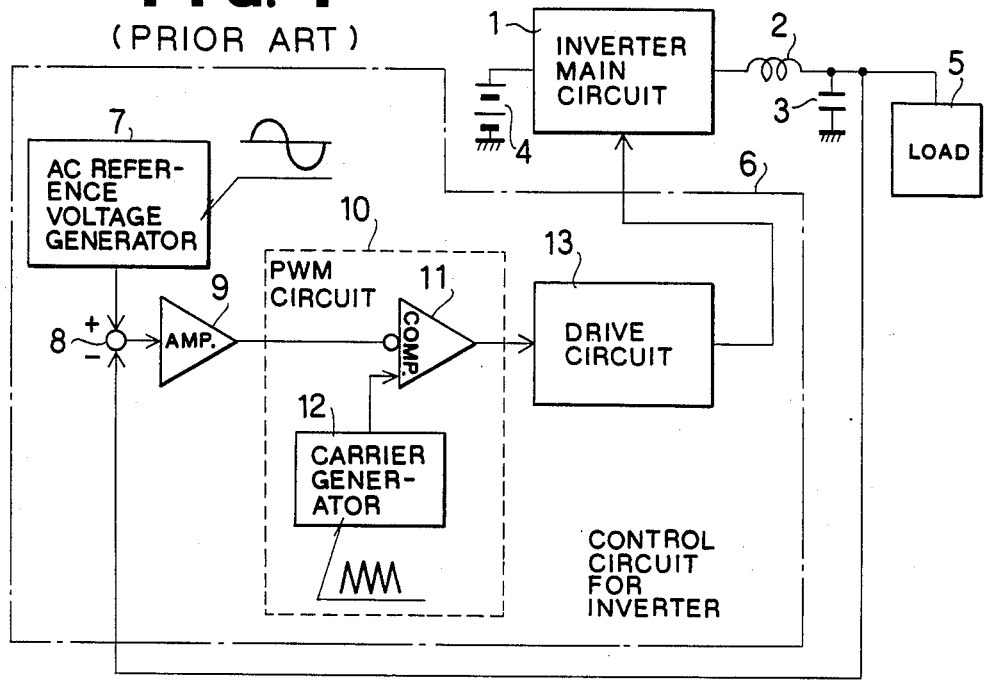
FIG. 1 is a structure of an inverter of the prior art.
Figure 6:
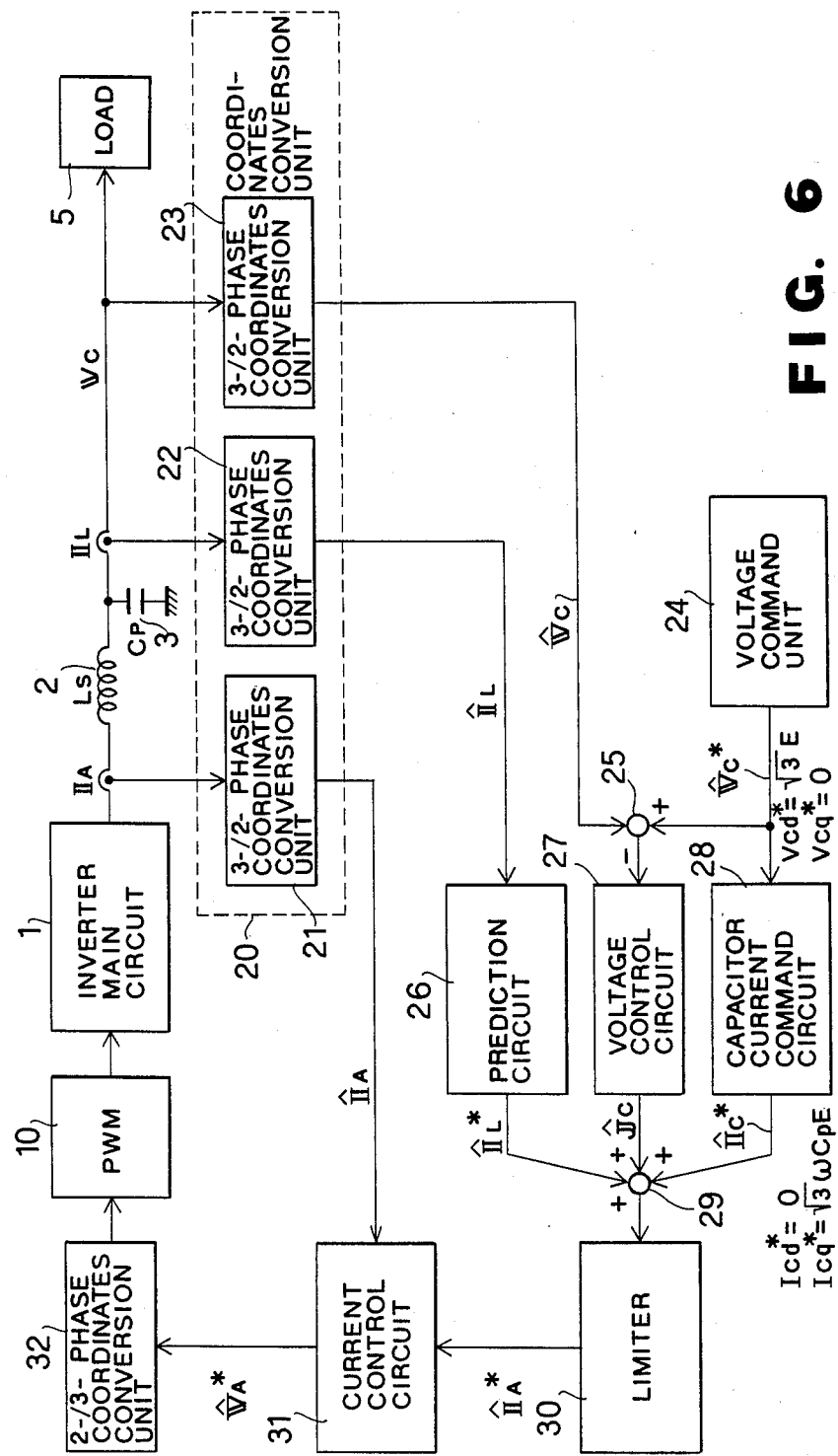
FIG. 6 is a block diagram of an embodiment which indicates the principle of the present invention.

FIG. 6 shows a basic structure of the present invention. The main circuit is a 3-phase instantaneous current control type inverter with LC filter and provides a 3-phase sinusoidal voltage at the output thereof. Elements given the same reference numbers as those in FIG. 1 indicate the same or corresponding elements.

Figure 3:
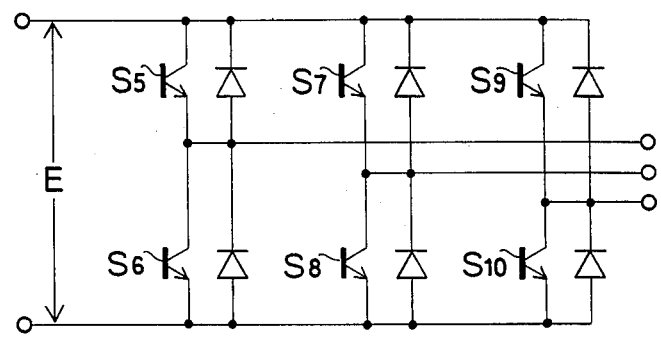
FIG. 3 is a circuit diagram of an inverter which is an example of the 3-phase converter as the object of the present invention.

In FIG. 6, the inverter main circuit 1 is, for example, a 3-phase voltage type inverter as indicated in FIG. 3 and generates a PWM output waveform through high frequency switching operations controlled by the output of the PWM circuit 10 of the triangle comparison circuit. A series reactor 2 and a parallel capacitor 3 form a filter which eliminates harmonics of the output voltage of the inverter main circuit 1, while the 3-phase/2-phase coordinates conversion units 21, 22, 23 form a coordinates conversion unit 20 which converts output current and voltage of inverter 1 into the d, q axes by the synchronous revolutional coordinates system and the 2-phase/3-phase coordinates conversion unit 32 is a coordinates conversion means which converts a command value on the d, q axes into the 3-phase value of a current control circuit 31. A capacitor current command circuit 28 applies the d axis command value ($=0$) to be applied to the capacitor 3 and the q axis command value ($=\sqrt{3}\ \omega C_p E$) to an adder 29. Next, a voltage control circuit 27 receives the command values $\sqrt{3}\ E$ and OE on the d, q axes of the voltage command unit 24 and deviation of feedback signal from the 3-phase/2-phase conversion unit 23 from the subtractor 25 and applies the control signal to the adder 29 through the voltage control circuit 27 in order to make zero the deviation. Next, the prediction circuit 26 receives the load current of the d-q axes from the 3-phase/2-phase conversion unit 22, and predicts the load current using a second-order prediction equation using the load current value of the past and applies it to the adder 29.

A limiter 30 limits an output of the adder 29 within the tolerance of overcurrent of the inverter and applies it to the circuit 31 as a current command.

As explained above, the 3-phase voltage and current are expressed as DC components on the d-q axes $\hat{V}_C$, $\hat{I}_A$ and etc. by the synchronous revolutional coordinates system and the control system is formed on the d-q axes. The current control system controls the inverter output $\hat{I}_A$ to follow the command $\hat{I}_A{}^*$. For simplification, the carrier period $T_{SW}$ of PWM is set to be 1/integer of the sampling $T_S$ of DDC (Direct Digital Control). Introduction of finite time settlement control realizes the response of one sample of the current control system. In case the three phase voltage command peak value is set to $\sqrt{2}\ E$, the d axis component thereof becomes $\sqrt{3}\ E$ and the q axis component thereof becomes 0 as will be explained later.

In this case, the component of current $\hat{I}_C{}^*$ to be applied to the capacitor 3 as the parallel element $C_P$ of the output filter is indicated in FIG. 6. A no-load voltage is established by applying this current command of the capacitor.

Next, the load current after one discretization time after is predicted and it is then applied as a feed forward signal. The current control system follows such signal quickly to cope with distortion or sudden change of a load current.

The voltage major loop corrects distortion of output voltage from the sine wave reference due to various causes explained later in order to stabilize the system and also assures the constant voltage characteristics.

(a) Disturbance of output voltage generated by too fast change rate of load current which the current minor loop cannot follow . . . current of rectifier load or an inrush current of a load.

(b) Error of output voltage due to the tracking error of the current minor loop resulting from deviation of actual main circuit constants from design values.

(c) Error of output voltage caused by the lag time of switching of devices and current tracking deviation by the short-circuit preventing time Td.

If output voltage is disturbed by such causes, a load current differs from the desired waveform and when such current is fed forward for the current minor loop, the voltage will be further disturbed, making the system unstable. In order to stabilize the system, the finite time settlement control having excellent quick response characteristic is also introduced for the voltage control system to form a structure called "Double Dead Beat Control System". A sum of the above three signals is limited by the limiter 30 and it is then applied as a current command. Thereby, a very easy applicable sinusoidal voltage inverter, in which an output overcurrent is suppressed by the property of the inverter itself, can be obtained. Moreover, the DC voltage variation can be compensated easily when the inverter voltage command $\hat{V}_A^*$ is converted to the three axes from two axes and applied to the PWM 10.

Figure 7:
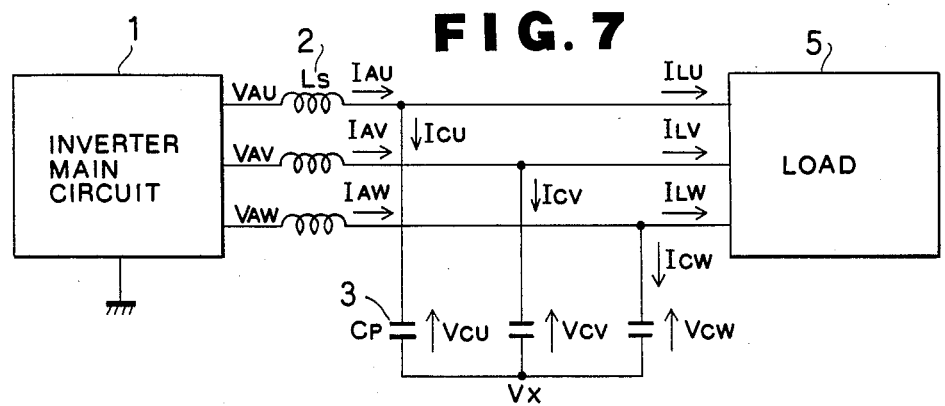
FIG. 7 is a main circuit diagram of an inverter for explaining the 3-phase converter as an object of the present invention.

In FIG. 7, the state equations in the 3-phase expressions are obtained considering $I_A$, $V_C$ of each phase as state parameters, $V_A$ as input parameter and $I_L$ as disturbance. Where, the parameters used in such expression are defined as follow:

DESCRIPTION OF PARAMETERS

| | |
|---|---|
| $V_A$; | inverter voltage (for the earth) |
| $V_C$; | voltage across terminals of capacitor |
| $I_A$; | inverter current |
| $I_C$; | capacitor current |
| $I_L$; | load current |
| $V_X$; | voltage at neutral point of capacitor |

The subscripts are defined as follows:

| | |
|---|---|
| U, V, W; | phase elements of 3-phase |
| d, q; | elements of 2 axes expression |
| *; | command value (where $I_L^*$ is predicted value) |
| ω; | angular velocity of output frequency |
| T; | discretization time |
| ˆ; | value in the synchronous revolutional coordinates system |

From the 3-phase vector expression, $$C_P \frac{d}{dt} \mathbb{V}_C = \mathbb{I}_A - \mathbb{I}_L \quad (1)$$

$$L_S \frac{d}{dt} \mathbb{I}_A = \mathbb{V}_A - \mathbb{V}_C - \mathbb{V}_X \quad (2)$$

Where, $I_A$, $V_A$ are matrices and subscripts are respectively given to the expression (3). $L_S$, $C_P$ are expressed by the equations (4).

$$\mathbb{I} = \begin{pmatrix} I_U \\ I_V \\ I_W \end{pmatrix}, \mathbb{V} = \begin{pmatrix} V_U \\ V_V \\ V_W \end{pmatrix} \quad (3)$$

$$\mathbb{L}_S = \begin{pmatrix} L_S & 0 & 0 \\ 0 & L_S & 0 \\ 0 & 0 & L_S \end{pmatrix} \quad (4)$$

$$\mathbb{C}_P = \begin{pmatrix} C_P & 0 & 0 \\ 0 & C_P & 0 \\ 0 & 0 & C_P \end{pmatrix}$$

From the relation between $V_X$ and inverter voltage, the following equation is established.

$$V_X = (V_{AU} + V_{AV} + V_{AW})/3 \quad (5)$$

From the equations (2), (5), the equation (6) can be obtained.

$$L_S \frac{d}{dt} \mathbb{I}_A = D \mathbb{V}_A - \mathbb{V}_C \quad (6)$$

Where;

$$D = \frac{1}{3} \begin{pmatrix} 2 & -1 & -1 \\ -1 & 2 & -1 \\ -1 & -1 & 2 \end{pmatrix} \quad (7)$$

Next, the equations (1), (6) are converted to the synchronous revolutional coordinates system with the conversion matrix C of equation (8).

To distinguish from the 3-phase expression, voltage, current of the q-d-0 or q-d coordinates system are expressed as , .

$$C = \sqrt{\frac{2}{3}} \begin{pmatrix} \cos\omega t & \cos(\omega t - 2\pi/3) & \cos(\omega t + 2\pi/3) \\ \sin\omega t & \sin(\omega t - 2\pi/3) & \sin(\omega t + 2\pi/3) \\ 1/\sqrt{2} & 1/\sqrt{2} & 1/\sqrt{2} \end{pmatrix} \quad (8)$$

Relation between the 3-phase expression and 2-axis expression is indicated by the equations (9).

$$\hat{\mathbb{V}} = \begin{pmatrix} V_q \\ V_d \\ V_0 \end{pmatrix} = C \begin{pmatrix} V_U \\ V_V \\ V_W \end{pmatrix} = \\ \hat{\mathbb{I}} = \begin{pmatrix} I_q \\ I_d \\ I_0 \end{pmatrix} = C \begin{pmatrix} I_U \\ I_V \\ I_W \end{pmatrix} = \quad (9)$$

Next, the following equations can be obtained by multiplying C to both sides of the equation which is obtained from equation (6) by converting it to the 2-axis coordinates system, using the equation (9).

$$C L_S \frac{d}{dt}(C^{-1} \hat{\mathbb{I}}_A) = C D C^{-1} \hat{\mathbb{V}}_A - \hat{\mathbb{V}}_C \quad (10)$$

Here, there are the following relations (11).

$$C D C^{-1} = \begin{pmatrix} 1 & 0 & 0 \\ 0 & 1 & 0 \\ 0 & 0 & 0 \end{pmatrix}$$

$$C L_S \frac{d}{dt}(C^{-1}) = \begin{pmatrix} 0 & \omega L_S & 0 \\ -\omega L_S & 0 & 0 \\ 0 & 0 & 0 \end{pmatrix} \quad (11)$$

$$C L_S C^{-1} = L_S$$

Moreover, following equation can be attained by adopting the equation (11) to (10).

$$\begin{pmatrix} 0 & \omega L_S & 0 \\ -\omega L_S & 0 & 0 \\ 0 & 0 & 0 \end{pmatrix} \hat{\mathbb{I}}_A + L_S \frac{d}{dt} \hat{\mathbb{I}}_A = \begin{pmatrix} 1 & 0 & 0 \\ 0 & 1 & 0 \\ 0 & 0 & 0 \end{pmatrix} \hat{\mathbb{V}}_A - \hat{\mathbb{V}}_C \quad (12)$$

In the expression (12), the 0-axis component is neglected because it is not related to the other components. Therefore, following equation can be obtained.

$$\begin{pmatrix} 0 & \omega L_S \\ -\omega L_S & 0 \end{pmatrix} \begin{pmatrix} I_{Aq} \\ I_{Ad} \end{pmatrix} + L_S \frac{d}{dt} \begin{pmatrix} I_{Aq} \\ I_{Ad} \end{pmatrix} = \begin{pmatrix} V_{Aq} \\ V_{Ad} \end{pmatrix} - \begin{pmatrix} V_{Cq} \\ V_{Cd} \end{pmatrix} \quad (13)$$

The equation (13) can be transformed into the equation (14) of the usual state equation.

$$\begin{pmatrix} \dot{I}_{Aq} \\ \dot{I}_{Ad} \end{pmatrix} = \begin{pmatrix} 0 & -\omega \\ \omega & 0 \end{pmatrix} \begin{pmatrix} I_{Aq} \\ I_{Ad} \end{pmatrix} + \begin{pmatrix} 1/L_S & 0 \\ 0 & 1/L_S \end{pmatrix} \begin{pmatrix} V_{Aq} \\ V_{Ad} \end{pmatrix} - \begin{pmatrix} 1/L_S & 0 \\ 0 & 1/L_S \end{pmatrix} \begin{pmatrix} V_{Cq} \\ V_{Cd} \end{pmatrix} \quad (14)$$

Next, following equation can be obtained by multiplying C to both sides of the equation which is obtained through convertion of equation (1) to the q-d coordinates system, using the equation (9).

$$C C_P \frac{d}{dt}(C^{-1} \hat{V}_C) = \hat{I}_A - \hat{I}_L \quad (15)$$

Here, $$C C_P \frac{d}{dt}(C^{-1}) = \begin{pmatrix} 0 & \omega C_P & 0 \\ -\omega C_P & 0 & 0 \\ 0 & 0 & 0 \end{pmatrix} \quad (16)$$

$$C C_P C^{-1} = C_P$$

From the expressions (15), (16), $$\begin{pmatrix} 0 & \omega C_P & 0 \\ -\omega C_P & 0 & 0 \\ 0 & 0 & 0 \end{pmatrix} \hat{V}_C + C_P \frac{d}{dt} \hat{V}_C = \hat{I}_A - \hat{I}_L \quad (17)$$

In the equation (17), the 0-axis component is neglected because it is not related to the other components. Therefore, following equation can be obtained.

$$\begin{pmatrix} 0 & \omega C_P \\ -\omega C_P & 0 \end{pmatrix} \begin{pmatrix} V_{Cq} \\ V_{Cd} \end{pmatrix} + C_P \frac{d}{dt} \begin{pmatrix} V_{Cq} \\ V_{Cd} \end{pmatrix} = \begin{pmatrix} I_{Aq} \\ I_{Ad} \end{pmatrix} - \begin{pmatrix} I_{Lq} \\ I_{Ld} \end{pmatrix} \quad (18)$$

It can be modified to the form of usual state equation as follows.

$$\begin{pmatrix} \dot{V}_{Cq} \\ \dot{V}_{Cd} \end{pmatrix} = \begin{pmatrix} 0 & -\omega \\ \omega & 0 \end{pmatrix} \begin{pmatrix} V_{Cq} \\ V_{Cd} \end{pmatrix} + \begin{pmatrix} 1/C_P & 0 \\ 0 & 1/C_P \end{pmatrix} \begin{pmatrix} I_{Aq} \\ I_{Ad} \end{pmatrix} - \begin{pmatrix} 1/C_P & 0 \\ 0 & 1/C_P \end{pmatrix} \begin{pmatrix} I_{Lq} \\ I_{Ld} \end{pmatrix} \quad (19)$$

When the output voltage command value is expressed by the equation (20), the 2-axis conversion thereof can be obtained as indicated by the equation (21).

$$\hat{V}_{C^*} = \begin{pmatrix} V_{CU^*} \\ V_{CV^*} \\ V_{CW^*} \end{pmatrix} = \begin{pmatrix} \sqrt{2} E \sin(\omega t) \\ \sqrt{2} E \sin(\omega t - 2\pi/3) \\ \sqrt{2} E \sin(\omega t + 2\pi/3) \end{pmatrix} \quad (20)$$

$$\hat{V}_{C^*} = \begin{pmatrix} V_{Cq^*} \\ V_{Cd^*} \end{pmatrix} = C \hat{V}_{C^*} = \begin{pmatrix} 0 \\ \sqrt{3} E \end{pmatrix} \quad (21)$$

The current command of the capacitor $C_P$, can be obtained by equation (22).

$$\hat{I}_{C^*} = C_P \frac{d}{dt} \hat{V}_{C^*} \quad (22)$$

And, it is converted to the 2-axis by adopting the relations of expressions (9) and (20) to the equation (22) and thereby the following relation can be obtained.

$$\hat{I}_{C^*} = \begin{pmatrix} I_{Cq^*} \\ I_{Cd^*} \end{pmatrix} = \begin{pmatrix} \sqrt{3} \omega C_P E \\ 0 \end{pmatrix} \quad (23)$$

The state equations (14), (19) in the 2-axis coordinates system obtained previously will be transformed to the discretized form as follows.

First, the expression (14) is transformed to the form of equation (24) and A, F of the state equation (25) of the discretized form will be obtained.

$$\dot{\hat{I}}_A(t) = A' \hat{I}_A(t) + F' \hat{V}_A(t) - F' \hat{V}_C(t) \quad (24)$$

$$\hat{I}_A(k+1) = A \hat{I}_A(k) + F \hat{V}_A(k) - F \hat{V}_C(k) \quad (25)$$

$$A = a^{-1}[(S I - A')^{-1}] = \begin{pmatrix} a & -b \\ b & a \end{pmatrix} \quad (26)$$

$$F = \int_0^T A(T-r)F' dr = \begin{pmatrix} c & -d \\ d & c \end{pmatrix} \quad (27)$$

Next, the expression (19) will be transformed to the expression (28) indicated below.

$$\dot{\hat{V}}_C(t) = A' \hat{V}_C(t) + K' \hat{I}_A(t) - K' \hat{I}_L(t) \quad (28)$$

Next, the gain K of the discretized state equation (29) is obtained as indicated below.

$$\hat{V}_C(k+1) = A \hat{V}_C(k) + K \hat{I}_A(k) - K \hat{I}_L(k) \quad (29)$$

$$K = \int_0^T A(T-r)K' dr = \begin{pmatrix} e & -f \\ f & e \end{pmatrix} \quad (30)$$

Calculation results of respective elements of matrices of equation (26), (27) and (30) are given by the following equations.

$$a = \cos\omega T, \ b = \sin\omega T, \ c = \frac{1}{\omega L_S}\sin\omega T,$$
$$d = \frac{2}{\omega L_S}\sin^2\frac{\omega T}{2}, \ e = \frac{1}{\omega C_P}\sin\omega T,$$
$$f = \frac{2}{\omega C_P}\sin^2\frac{\omega T}{2}$$
(31)

Where, T: discretization time

In the expression (25), the control parameter is set as equation (32), focusing on a voltage to be applied to the reactor $L_S$.

$$\hat{V}_{AC}(k) = \hat{V}_A(k) - \hat{V}_C(k) \tag{32}$$

Here, the equation (25) is transformed by the Z-transform method as indicated in the equation (33).

$$z\hat{I}_A(Z) = \mathbb{A}\hat{I}_A(Z) + \mathbb{F}\hat{V}_{AC}(Z) \tag{33}$$

The relations of the equation (33) is expressed in the block diagram of FIG. 8. In this figure, the main circuit is shown to the right side of the dotted line of FIG. 8.

The 2-axis components interfere with each other by the coefficients b and d. Therefore, the compensation terms b/c and d/c are alternately given to the control signal as the feed forward in order to cancel such 2-axis interference. Thereby, interference can be decoupled and the Dead Beat System of the proportion+integral control is provided as indicated in FIG. 8. By employing the integral control, the signal to compensate for the effect of the short-circuit preventing time Td, which changes its polarity at the moment when the inverter current crosses 0, enters into the integral term and realizes high speed compensation of Td.

As the conditions for finite time settlement control, the gains $G_1$–$G_4$, which make zero the two roots of the loop transfer function of the system can be obtained as indicated below.

$$G_1 = G_3 = 1/c, \ G_2 = G_4 = -a/c \tag{34}$$

In summary, a block diagram of current control circuit is indicated in FIG. 9.

As the assumption to form a voltage control system, (i) the inverter should be an ideal current source by the current control system explained previously. (ii) the prediction value of load current is ideal, then $I_L^* = I_L$, and the current command $I_C^*$ of capacitor should also be ideal. To obtain an expression consisting only of deviation, the inverter current is separated as equation (35). The output of the voltage controller is $J_C$.

$$\hat{I}_A = \hat{I}_C^* + \hat{I}_L^* + \hat{J}_C \tag{35}$$

And, deviation from the command value of capacitor voltage is set as follows.

$$\hat{V}_E(k) = \hat{V}_C(k) - \hat{V}_C^*(k-1) \tag{36}$$

In addition, the capacitor voltage command value can be expressed as follows with reference to the equation (29).

$$\hat{V}_{C^*}(k) = \mathbb{A}\hat{V}_{C^*}(k-1) + \mathbb{K}\hat{I}_{C^*}(k) \tag{37}$$

The expression (29) can be summarized as indicated below using the expressions (35), (36) and (37).

$$\hat{V}_E(k+1) = \mathbb{A}\hat{V}_E(k) + \mathbb{K}\hat{J}_C(k) \tag{38}$$

This expression indicates the relationship between the deviation of output voltage and the output of the voltage controller. This expression can also be Z-transformed as indicated below.

$$z\hat{V}_E(Z) = \mathbb{A}\hat{V}_E(Z) + \mathbb{K}\hat{J}_C(Z) \tag{39}$$

Figure 10:
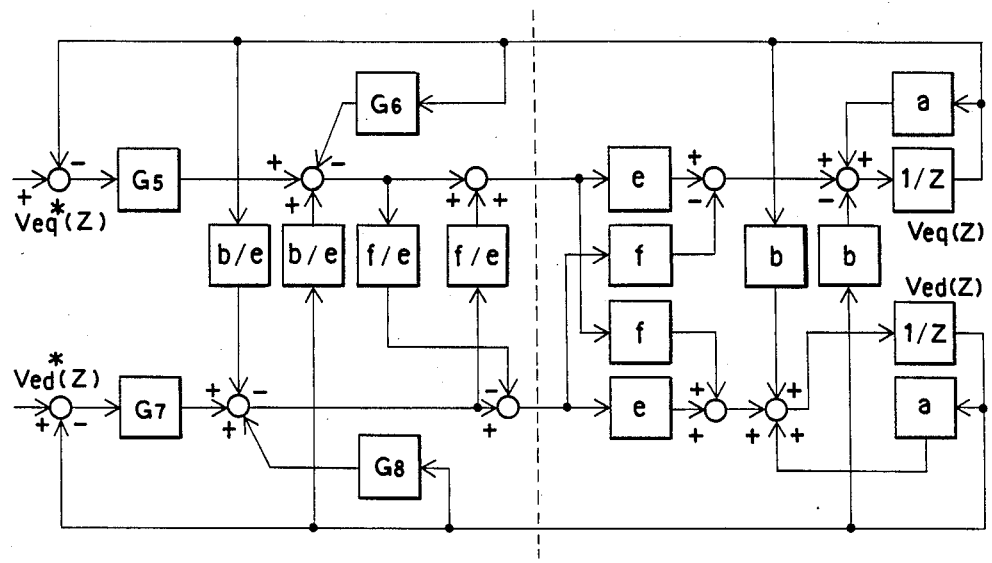
FIG. 10 is a block diagram of a voltage control system.

The expression (39) can be expressed in the block diagram as indicated to the right side of the dotted line of FIG. 10. The command value of the deviation in FIG. 10 is, needless to say, zero.

As in the case of the current control system, interferences by the terms b and f are decoupled by the b/e and f/e terms in order to form the decoupled system and thereafter the Dead Beat System of proportional control is provided. In this case, the integral control is not employed because the integral control is already used for the current minor loop and if the integral control is used for both current and voltage controls, the system becomes unstable.

As the condition for finite time settlement of the system indicated in FIG. 10, following relationship is obtained.

$$G_5 = G_7 = 1/e, \ G_6 = G_8 = (1-a)/e \tag{40}$$

Figure 11:
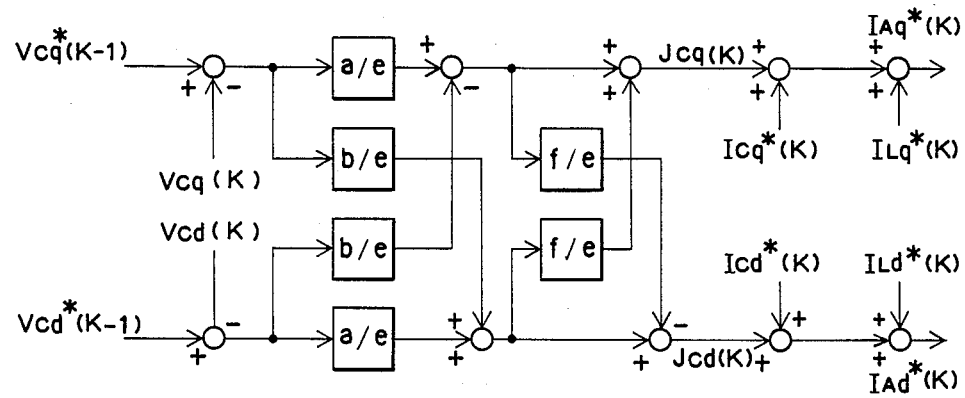
FIG. 11 is a block diagram of a voltage control circuit.

In summary, FIG. 11 can be obtained as the block diagram of the voltage control circuit.

In the case of finite time settlement control, control operations in the period T can be definitely determined, by giving a target value at the final point of the discretization time T. Since $J_C$ and $I_C^*$ are given internally in the current control system of FIG. 6, the target value can be determined by obtaining a load current after the discretization time T with the prediction method. To fully utilize inverter pulse width by outputting the voltage command to the PWM circuit, while the processor is executing the computation of this sampling time, and to compensate the computing time delay, a new method to use the discretization time T of twice of the sampling time $T_S$ is adopted. To distinguish from k of discretization, m is used as the number of sampling. When $t = mT_S$, as indicated in FIG. 12, a predicted value $I_L^*(m)$ of the current at $t = (m+2)T_S$ can be obtained from the following second-order prediction formula using $I_L(m-2)$, $I_L(m-1)$, $I_L(m)$.

$$I_L^*(m) = 6I_L(m) - 8I_L(m-1) + 3I_L(m-2) \tag{41}$$

Figure 12:
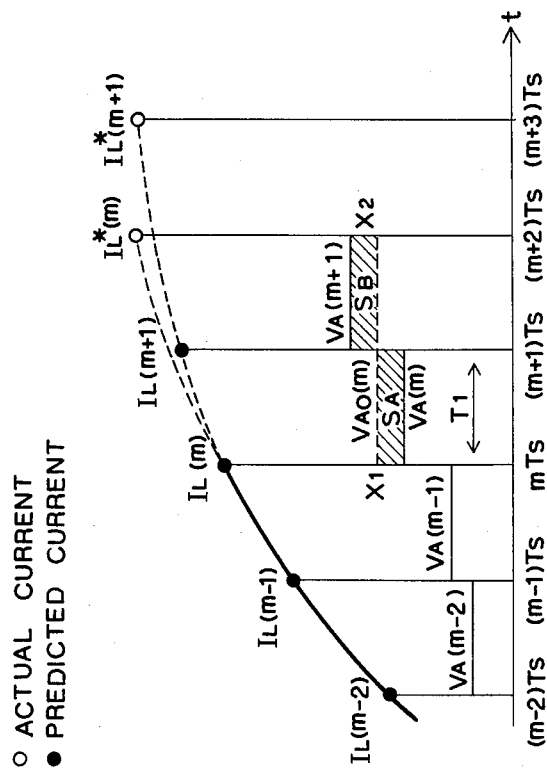
FIG. 12 is a diagram explaining the principle of prediction of the load current and compensation for calculation time lag in the sampled data control of the present invention.

Since the calculation time $T_1$ is necessary to obtain an inverter output command to realize a load current given by the mark in the FIG. 12, the preceding calculation result $V_A(m)$ is output for the period of $mT_S - (m+1)T_S$. In case the calculation result is $V_{AO}(m)$ indicated by the level $X_1 - X_2$, the output $V_A(m+1) = 2V_{AO}(m) - V_A(m)$ which makes $S_B = S_A$ is output for the period of $(m+1)T_S - (M+2)T_S$ to compensate the insufficient area $S_A$. Next, the capacitor current command of FIG. 6 takes a constant value for constant voltage fixed frequency applications, but in case of variable voltage and frequency current command value should take a predicted value after the discretization time T. As will be understood from the expression (36), the voltage control is effectuated to the deviation between the command value $V_C^*$ (m−2) before two samples and the present value $V_C(m)$.

As explained above, it is enough that $T_S$ is determined a little longer than the required calculation time by the discretization means using twice the sampling time and the load current prediction. And therefore the current control system which copes with a high frequency PWM of several kHz or more can be realized.

Figure 14:
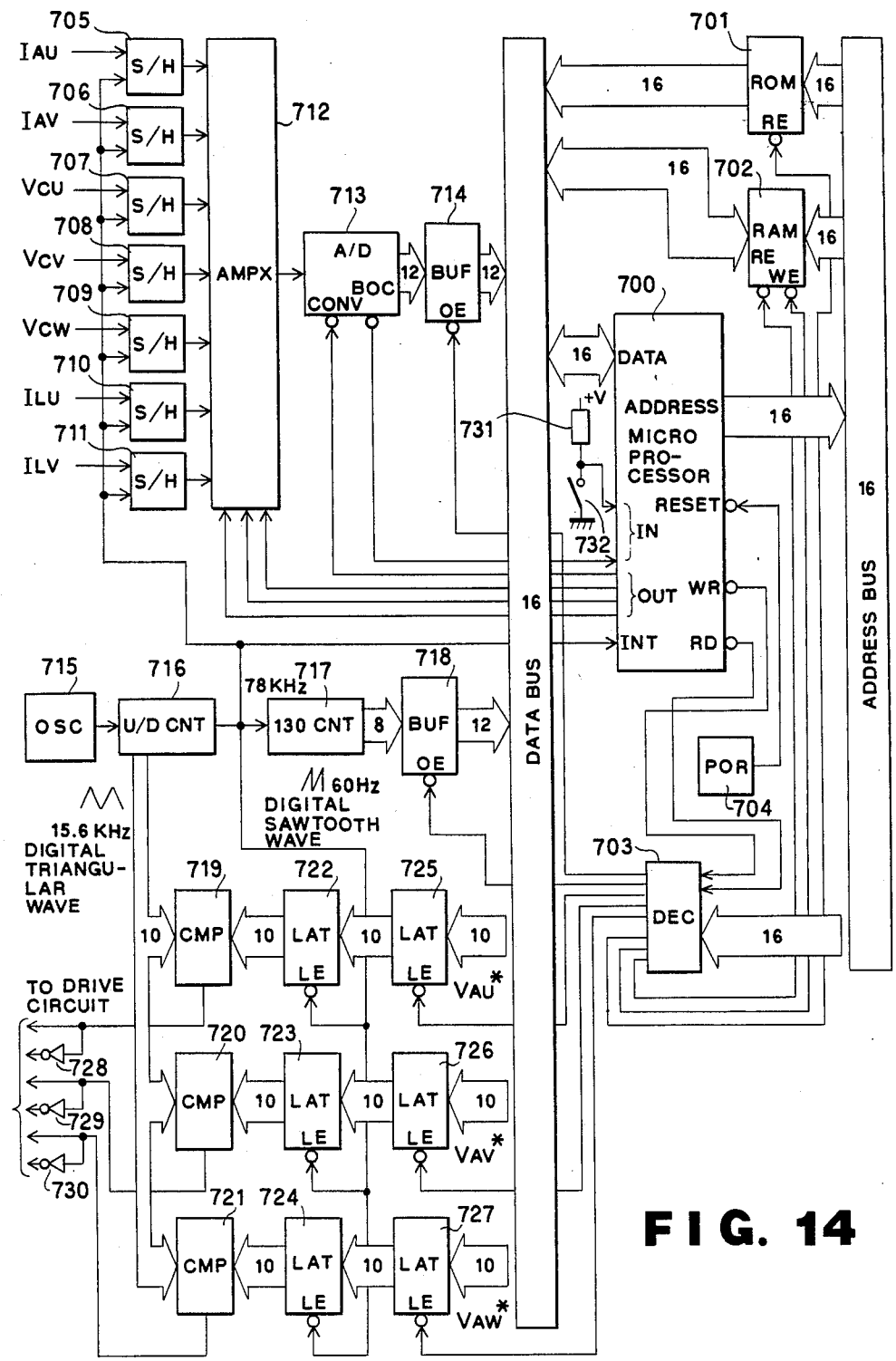
FIG. 14 is a block diagram of a control circuit as an embodiment of the control circuit for the 3-phase converter of the present invention.

FIG. 14 is a structure of a practical control circuit. In this figure, following symbols are used.

| MP | | Micro Processor (700) |
|---|---|---|
| | INT | Interrupt Input |
| | IN | Input Port |
| | OUT | Output Port |
| | WR | Write Strobe |
| | RD | Read Strobe |
| ROM | | Read Only Memory (701) |
| | RE | Read Enable |
| RAM | | Random Access Memory (702) |
| | RE | Read Enable |
| | WE | Write Enable |
| DEC | | Decoder (703) |
| POR | | Power On Reset Circuit (704) |
| S/H | | Sample and Hold Circuits (705 - 711) |
| AMPX | | Analog Multiplexer (712) |
| A/D | | Analog to Digital Converter (713) |
| | CONV | Convert |
| | EOC | End of Conversion |
| BUF | | Buffers (714, 718) |
| | OE | Output Enable |
| OSC | | Crystal Oscillator (715) |
| U/D | CNT | Up/Down Counter (716) |
| 130 | CNT | 130 Counter (717) |
| CMP | | Comparators (719-721) |
| LAT | | Latches (722-727) |
| | LE | Latch Enable |

The control circuit comprises a microprocessor 700, a ROM 701, a RAM 702, a decoder 703, a power on reset 704, sample hold circuits 705–711, an analog multiplexer 712, an analog to digital converter 713, 3-state buffers 714, 718, a crystal oscillator 715, an up/down counter 716, a counter 717, comparators 719–721, latches 722–727, inverters 728–730, a pull up resistor 731 and a switch 732.

When the control power supply is turned ON, the power on reset circuit 704 resets the microprocessor 700. After the microprocessor 700 is reset, it operates in compliance with the program stored in the ROM (701).

The Dead Beat control (finite time settlement control) algorithm is executed in such process that the microprocessor 700 fetches the data from the buffer 714 having the feedback data of voltage and current and the buffer 718 having the phase data of output voltage, calculation is conducted using the memory of the RAM 702 in accordance with the program of the ROM 701. And the PWM output voltage command values $V_{AU}^*$, $V_{AV}^*$, $V_{AW}^*$ obtained by such calculation are output to the latches 725–727.

The ROM 701, RAM 702, buffer 714 having the current and voltage feedback data, the buffer 718 having phase data of output voltage and the latches 725–727 having PWM output voltage command value are all connected with a data bus and the data bus is controlled by the decoder 703.

Figure 15:
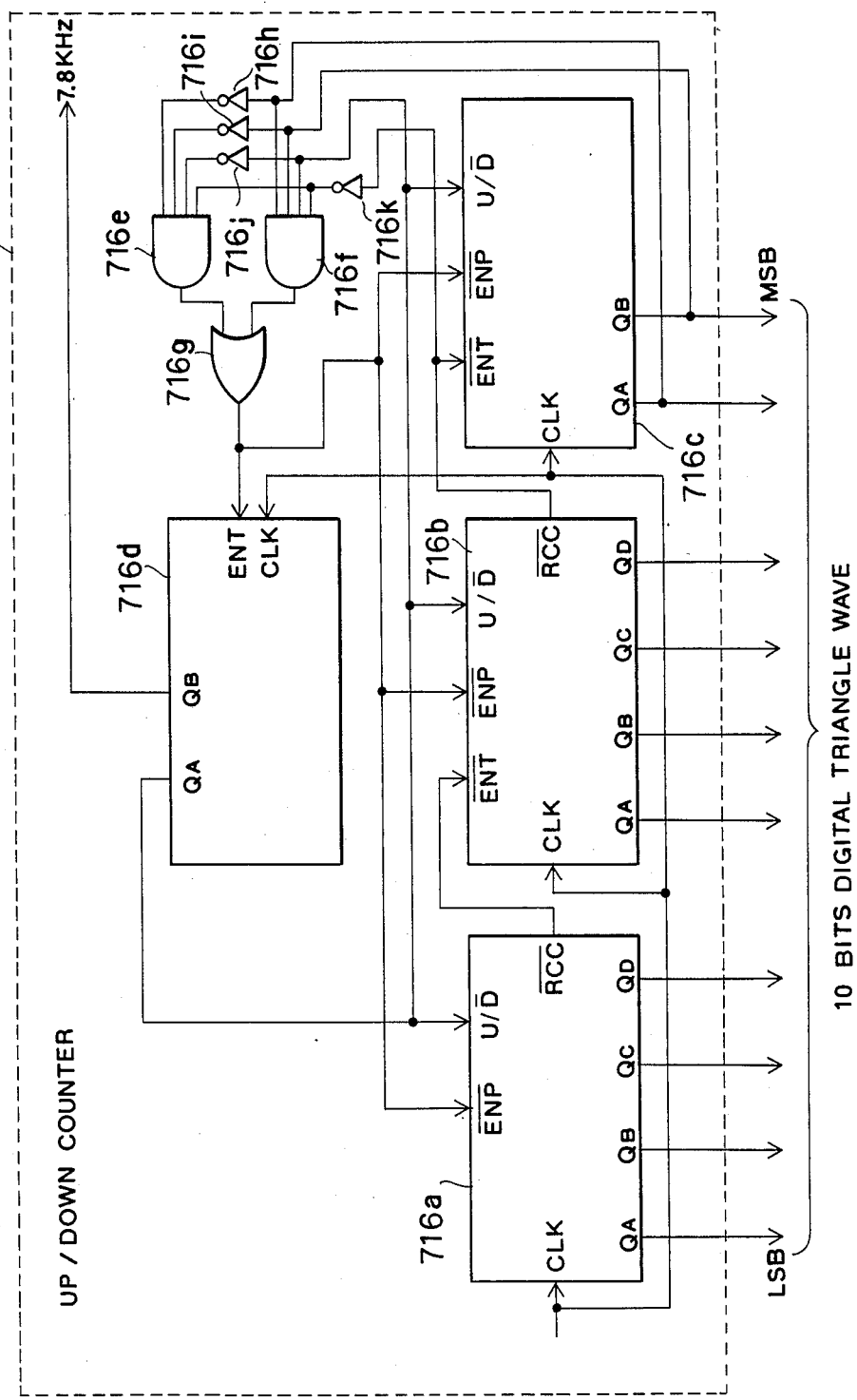
FIG. 15 is a block diagram which indicates the detail of up down counter in the embodiment of FIG. 4.

The interrupt signal to the microprocessor 700 which determines the sampling time is synchronized with the PWM carrier frequency. The digital 10 bits triangular waveform of 15.6 kHz and the clock of 7.8 kHz are obtained by inputting the 31.9488 MHz signal of the crystal oscillator 715 into the up/down counter 716. The up/down counter 716 forms, for example, the structure indicated in FIG. 15. In FIG. 15, numerals 716a–716c indicate 4-bits up/down synchronous counters, 716d indicates a synchronous 4-bits counter, 716e and 716f indicate 4 input positive AND gates, 716g indicates 2 input positive OR gate, and 716h–716k indicate inverters. The clock of 7.8 kHz is input to the interrupt 1st input port of the microprocessor 700 and thereby the control program is operated for every rising edge of the 7.8 kHz signal.

Moreover, the 7.8 kHz clock is then input to the 130-counter 717 in order to obtain the sawtooth wave of 60 Hz. The microprocessor 700 reads the count value of counter 717 in every interrupt of the 7.8 kHz signal to generate the phase command value of output voltage. In this example, an output voltage frequency is 60 Hz and the phase command value is expressed as indicated below. Phase command value={(counter value)/130}×2π(rad). The buffer 718 having the phase data is connected to the lower 12 bits of the data bus.

The current and voltage feedback can be conducted when the analog values of current and voltage are held in the sample hold circuits 705–711 in the timing of the rising edge of 7.8 kHz clock, namely in the interrupt timing of the microprocessor 700. Only one circuit of seven sample hold circuits is selected by the analog multiplexer 712 and the convert command is issued to the A/D converter 713. Upon completion of A/D conversion, the A/D conversion 713 outputs the End of convert signal. The microprocessor receives this signal and then reads the A/D conversion value through the buffer 714, which is connected to the lower 12 bits of the data bus. The channel selection signal of the analog multiplexer 712 and the convert signal of the A/D converter 713 are output from the output port of the microprocessor 700.

The PWM voltage command value is calculated within the sampling time and is then output to the latches 725–727 connected to the lower 10 bits of data bus. The data of latches 725–727 connected to the data bus is loaded to the latches 722–724 connected to the comparators 719–721 in the timing of rising edge of 7.8 kHz clock. The data of the latches 722–727 are compared with digital triangular wave of 15.6 kHz in the comparators 719–721 and the PWM output obtained thereby is connected to the drive circuit, which controls the switching devices such as the transistors of the main circuit, through the inverters 728–730.

A pull-up resistor 731 and a switch 732 are connected with the input port of the microprocessor 700. The microprocessor 700 reads the ON/OFF state of the switch 732. In case the switch 732 is ON, the microprocessor 700 starts the control and in case the switch is OFF, the microprocessor 700 initializes memory for starting the control.

Figure 16:
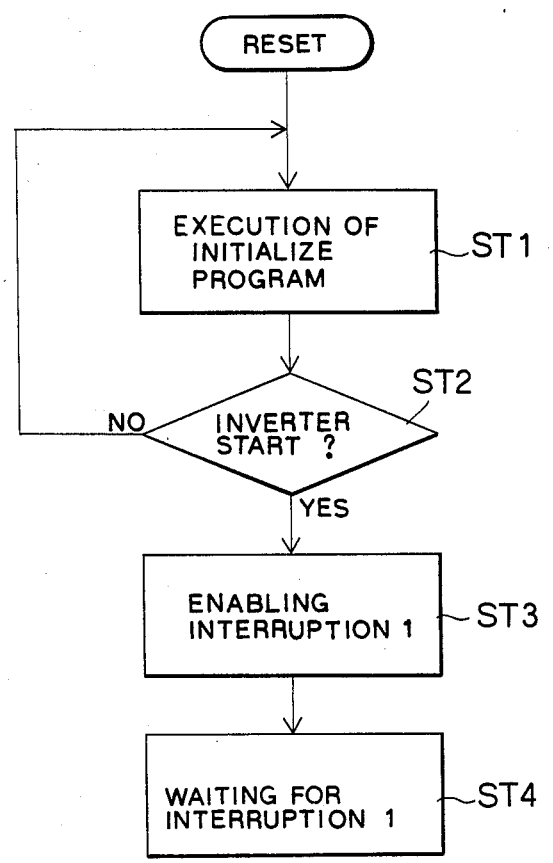
FIGS. 16–17C are flowcharts which indicate control program for the embodiment of FIG. 14.

The flowcharts of control program are indicated in FIG. 16 and FIG. 17.

When the control power supply is turned ON, the microprocessor 700 is reset, as indicated in FIG. 16, and executes the initialize program in the step 1 (ST1) and sets the port. Next, when the switch is set to the side of inverter start in the ST2, the microprocessor 700 allows acceptance of the interruption (ST3) and waits for the interruption (ST4).

Figure 17B:
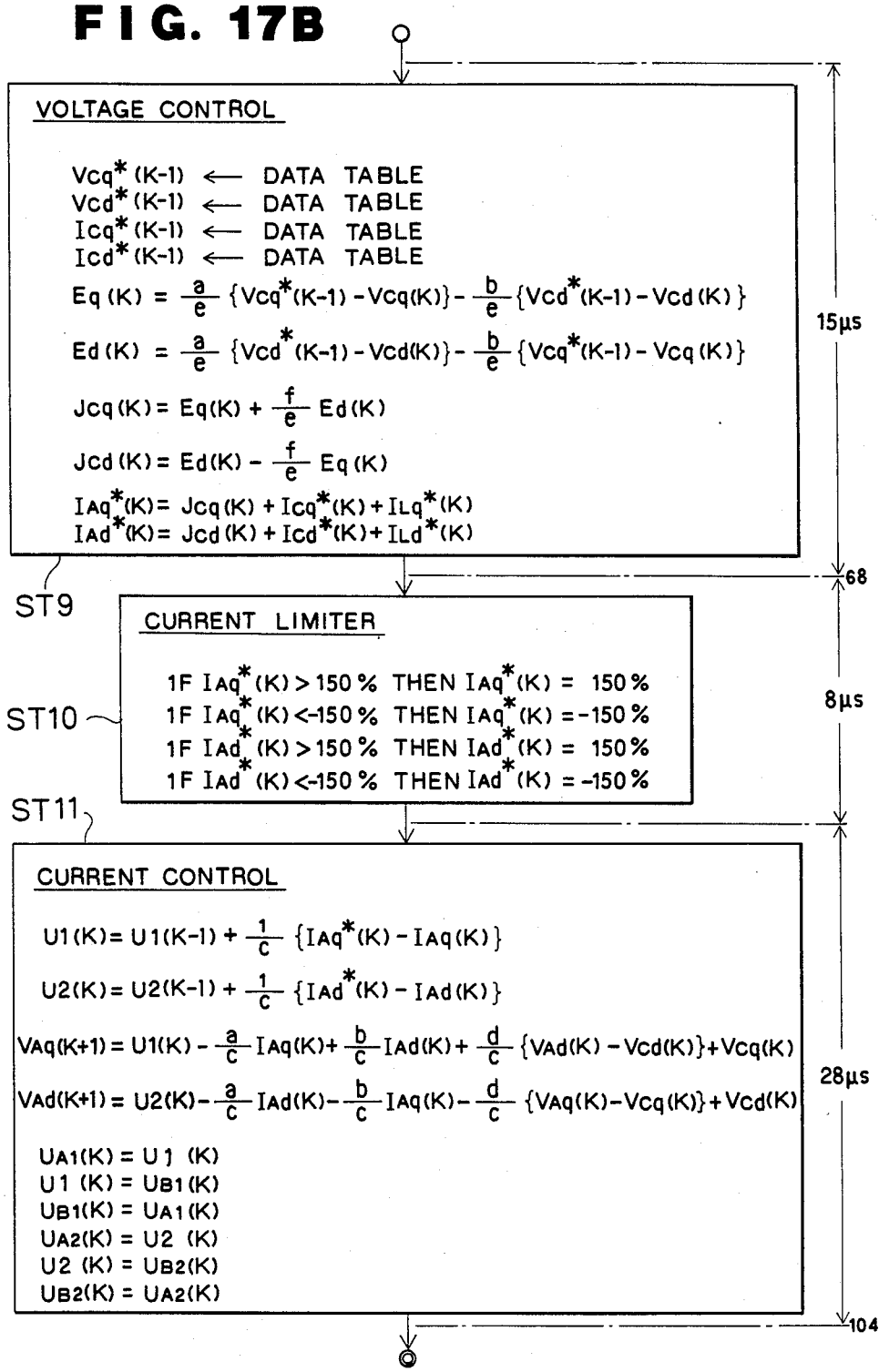
Figure 17C:
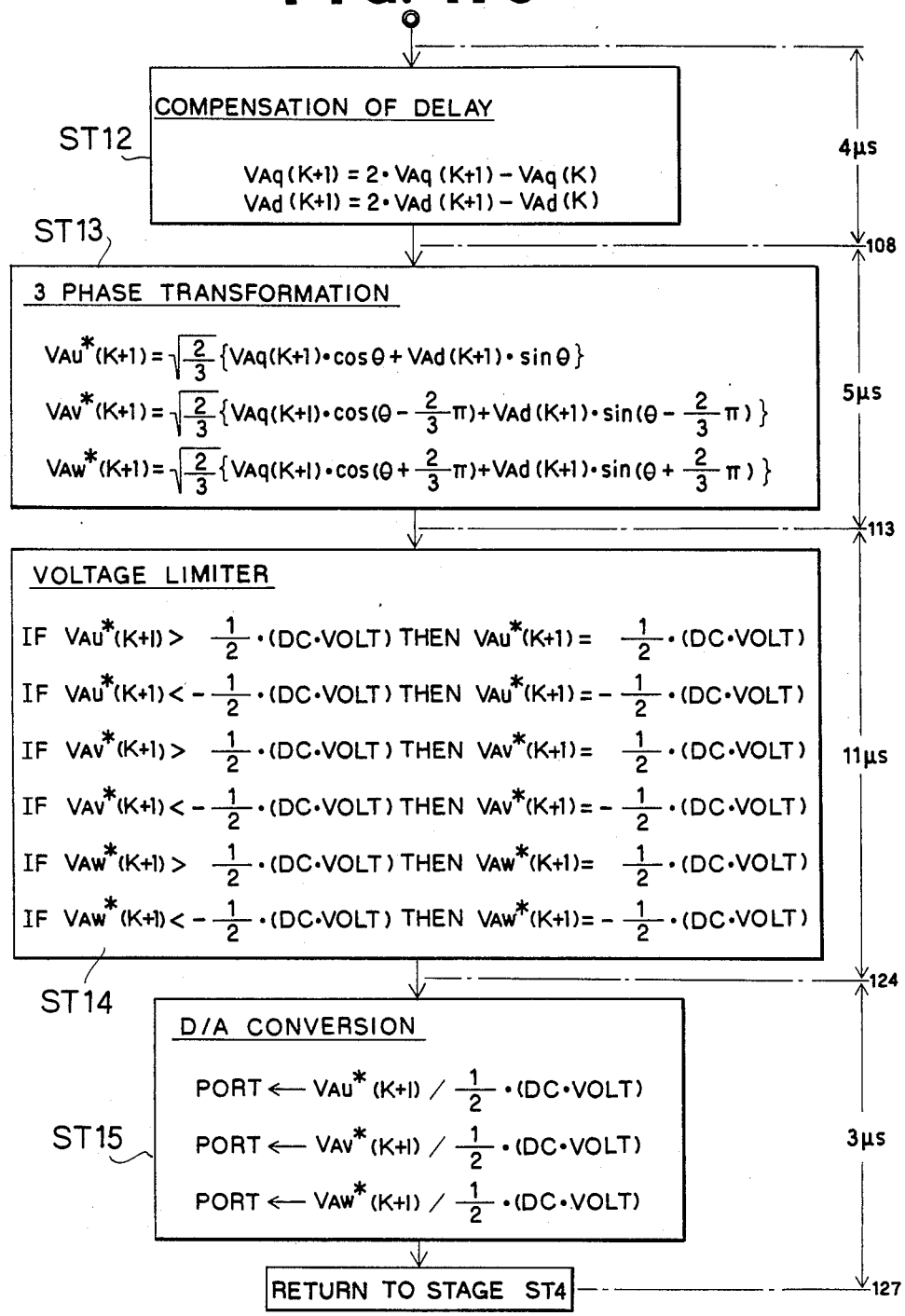

The calculation of Dead Beat control is carried out at every interruption of 7.8 kHz. Therefore, the operation time of microprocessor must be 128.2 μsec (1/7.8 kHz) or less. The processing time of each block and the maximum value of accumulated time are indicated at the side of flowcharts of FIGS. 17A–17C of interrupt program. The microprocessor 700 executes the processings from the ST5 to ST15 within the maximum time of 127 μsec as indicated in FIG. 17.

Next, the flowchart of interrupt program is explained hereunder.

| | |
|---|---|
| ST5 | When the switch is set to inverter stop mode, the initialize program is executed. |
| ST6 | Output voltage $\hat{V}_C$, output current $\hat{I}_A$, load current $\hat{I}_L$ are read from the A/D converter 713. |
| ST7 | $\hat{V}_C$, $\hat{I}_A$, $\hat{I}_L$ are converted to the d-q axes components. |
| ST8 | Prediction of load current $\hat{I}_L$ is carried out. |
| ST9 | Voltage control loop is calculated and current command value $\hat{I}_A^*$ is obtained. |
| ST10 | Current command value $\hat{I}_A^*$ is sent to the limiter. |
| ST11 | Current control loop is calculated and inverter output voltage command value $\hat{V}_A$ is obtained. |
| ST12 | Computing delay time is compensated. |
| ST13 | Inverter output voltage command value $\hat{V}_A^*$ is converted to 3-phase. |
| ST14 | Inverter output voltage command value $\hat{V}_A^*$ is applied to the limiter. |
| ST15 | $\hat{V}_A^*$ is divided by DC voltage and it is then output to the PWM circuit 10 as the command value. |

In order to confirm the principle explained above, the PWM by comparison of triangular wave and the time lag of the voltage and current sensors have been simulated in the analog part of the hybird computer, and the 16-bits DDC has been simulated in the digital part of the hybird computer. The circuit constants are determined as 10 kVA, 173/100 V, 60 Hz, Cp=200 μF (star), Ls=500 μH, Ts=128 μS, Td=3μS and time lag of voltage and current sensor=20 μS. The PWM is set to a frequency higher than the audible frequency by outputting twice the same pulse width during the period $T_S$ in order to realize noiseless operation.

Figure 13:
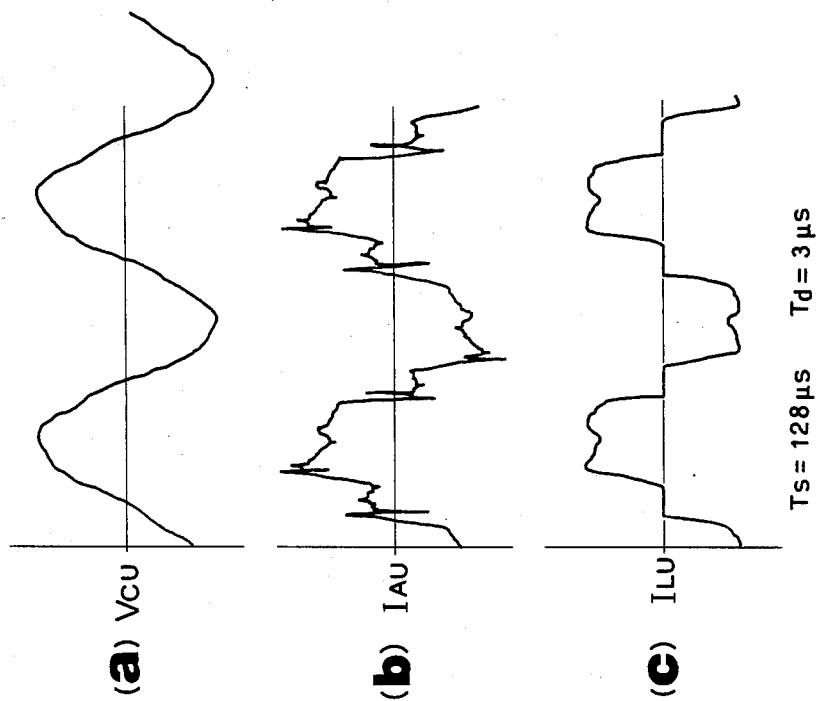
FIG. 13 indicates waveforms obtained from the simulation of the principle of the present invention, in which $V_{CU}$ of (a) is the U-phase voltage waveform after passing the filter, $I_{AU}$ of (b) is the output (input of filter) current waveform of the inverter, $I_{LU}$ of (c) is the input current waveform of load by the 3-phase diode rectifier circuit.

As a typical simulation under such condition, the operation waveforms in the DCL input type 3-phase diode rectifier load (corresponding to 8.0 kW) are indicated in FIG. 13. Since oscillatory error is generated in the second-order prediction when the changing rate of load current $I_L$ changes suddenly, then high frequency oscillation is also generated on the inverter current $I_A$ in accordance with such prediction error. However, it is absorbed by the capacitor 3; thereby good output waveform $V_C$ is obtained and it can be proved that the method of the present invention is reasonable.

In above explanation, both current minor loop and voltage major loop have been formed by the dead beat control system by DDC, but the principle of the present invention can also be realized by various control systems as explained hereunder.

(a) A method where the current minor loop is formed by the dead beat control system by the DDC while the voltage major loop is formed by the ordinary PI or IP control depending on the DDC.

(b) A method where the current minor loop is formed by the analog PI control system while the voltage major loop is formed by the dead beat control or PI control depending on the DDC.

(c) A method where the current minor loop is formed by the momentary response control system by a hysteresis comparator system, while the voltage major loop is formed by the proportion and integral (PI) control depending on the DDC.

Figure 2:
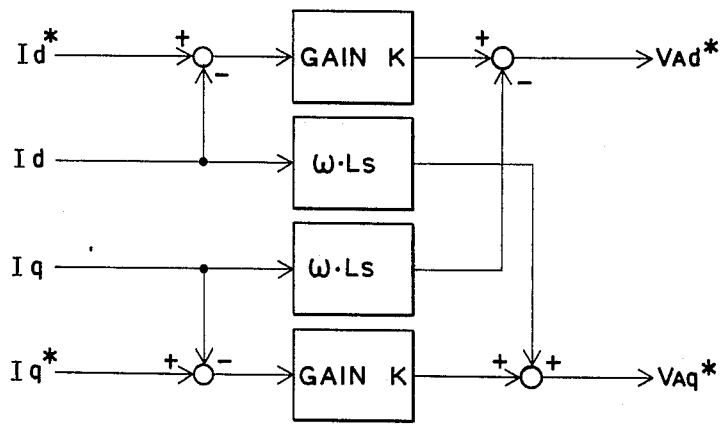
FIG. 2 is a block diagram for a decoupling method of 3-phase inverter of the prior art.

Moreover, it is also known even in FIG. 2 of the prior art that the interference by the term b between the d and q axes can decoupled by b/c=ωL$_S$. However, it has been made obvious first by the present invention that the interference by the term d exists in the main circuit and the method of decoupling this term by the term d/c of the control circuit has been introduced first by the present invention.

The d/c item can be expressed as indicated below using the equation (31).

$$\frac{d}{c} = \left(\frac{2}{\omega Ls}\sin^2\frac{\omega T}{2}\right)\frac{\omega Ls}{\sin\omega T} = \tan\frac{\omega T}{2}$$

It can be approximated as indicated below with an error of 5% or less in case ωT/2 is within 20 degrees=0.349.

$$\frac{d}{c} = \tan\frac{\omega T}{2} \simeq \frac{\omega T}{2}$$

In case the 3-phase converter is used in a constant frequency application, tan (ωT/2) may be used because term d/c becomes a constant. But it is desirable to shorten the calculation time, to use the decoupling method through approximation by ωT/2 in a variable frequency application.

The current minor loop of FIG. 8 which utilizes the decoupling method by the term d/c can also be applied to an active filter, high power factor converter, VVVF for vector control and cycloconverter in addition to the sine wave inverter shown in FIG. 6. In the VVVF and cycloconverter of the type of vector control, a design value of internal inductance of motor is used as a value of $L_S$ in FIG. 7. Moreover, it is also well known that the d, q axes components of internal counter-electromotive force of an induction motor can be calculated and used, in place of the capacitor voltage $V_C$.

Figure 4A:
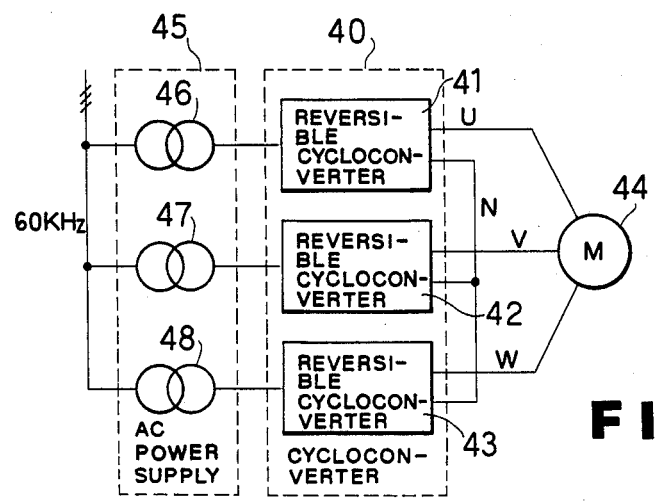
FIGS. 4A, 4B are circuit diagrams of a cycloconverter as an other example of a 3-phase converter.
Figure 4B:
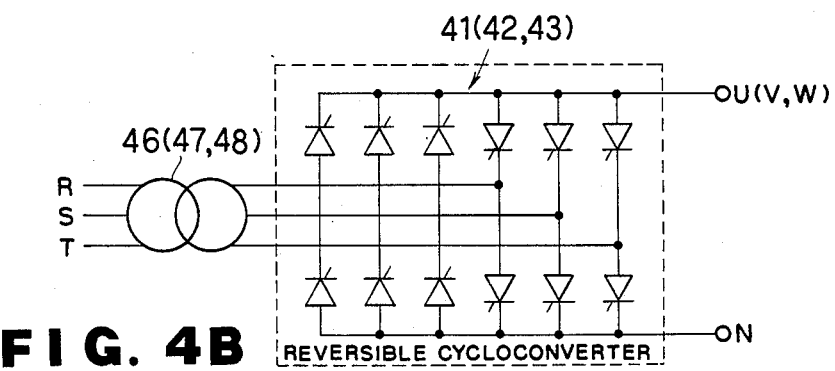

In above explanation, the 3-phase voltage type bridge inverter indicated in FIG. 3 has been mainly explained as the 3-phase converter, but the principle of the present invention can also be adopted to the other 3-phase converters. For example, the cycloconverter 40 indicated in FIG. 4A is formed by three units of reversible cycloconverters 41. The induction motor 44 is driven by the AC power supply 45 through such cycloconverter 40. This AC power supply 45 is used as the power supplies 46–48 corresponding to each reversible converter 41–43. In this case, the current minor loop of FIG. 8 and FIG. 9 may be adopted to the DDC control of the vector control type current minor loop as explained previously.

Figure 5A:
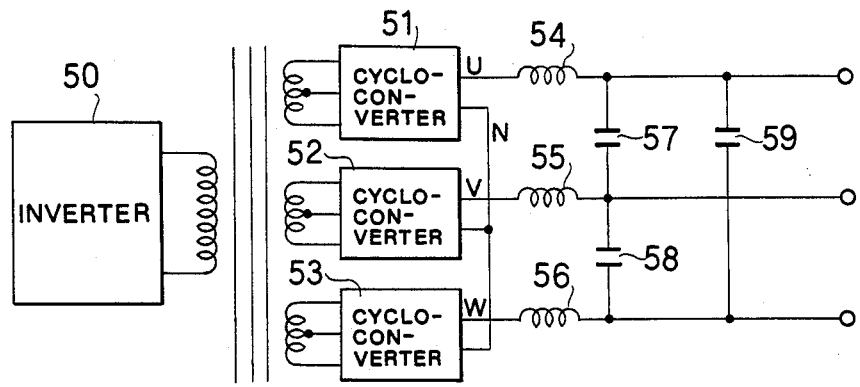
FIGS. 5A, 5B are circuit diagrams of a high frequency intermediate link type cycloconverter as a third example of a 3-phase converter.
Figure 5B:
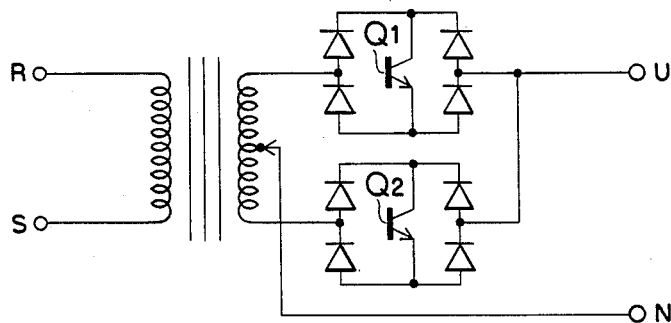

Next, the high frequency intermediate link type 3-phase sine wave converter indicated in FIG. 5A modulates the high frequency single phase power source generated by the inverter 50 with three units of cycloconverters 51–53 into a low frequency power of desired frequency by the self-extinction type devices indicated in FIG. 5B and obtains a low frequency sine wave through a filter consisting of reactors 54–56 and capacitors 57–59. In this case, after the control circuit of FIG. 6 is formed as in the case of inverter, a distribution circuit is provided after each phase output of the PWM circuit, for example, after the U phase output. And the sine wave can be obtained by distributing the output of the PWM circuit to transistors Q1 or Q2 of FIG. 5B depending on the polarity of inverter output.

Moreover, the 3-phase bridge inverter of FIG. 3 may be used in some cases, in place of the rectifier, as a so-called high power factor converter with less input current harmonics by converting the AC into the DC. However, in this case, the decoupling method by the present invention can also be adopted.

In the structure of FIG. 6 of the present invention, a load of control operation of the voltage major loop is reduced and accuracy also is improved by giving a current to be applied to the capcitor 3 to the current minor loop, but it is a matter of course that the system FIG. 6 may be operated even when a current command to be applied to the capacitor is omitted.

As is obvious from above explanation, the present invention realizes a control circuit for a 3-phase converter having the characteristics explained hereunder.

(a) A converter which comprises the inherent protection function for overcurrent of load has been realized by employing a new system where a high speed current minor loop is provided for the sine wave output converter having an L-C filter.

(b) Moreover, high speed control of voltage and current of the three-phase converter has been realized by forming a dead beat control system utilizing the prediction method.

(c) For a decoupling method of the 3-phase converter on the d-q axes, improvement in performance of sampling control system by the DDC has been realized by introducing the term tan ($\omega T/2$).

The system of the present invention can be applied generally to many kinds of main circuit and control hardwares such as a single bridge, multi-stage inverter, cycloconverter, synchronous or non-synchronous PWM system, DDC control and analog control, etc.

As explained earlier, the present invention provides the structure where a current command value of the converter necessary to generate the sine wave output voltage is produce and the instantaneous current control is carried out so that a converter current follows the current command value. Therefore, the present invention provides the effect that accuracy of inverter output voltage and transient response are good, distortion factor is small for load harmonics, and overcurrent protection of switching devices can be realized with the current minor loop for rush current and short-circuit of load. Particularly, excellent voltage accuracy and waveform can be attained against load current harmonics because compensation is not carried out after the generation voltage deviation, but it is controlled on the feed forward basis.

What is claimed is:

1. A controller for a 3-phase converter comprising:
   an output filter provided between a load and a 3-phase converter which converts power of a power supply into the AC power of desired frequency through an ON-OFF control of electric valves,
   a d-q current minor loop which accepts feedback of the d and q axes components of the output current of said converter converted by a synchronous revolutional coordinate system and controls the instantaneous value of the output current of the converter,
   a d-q voltage major loop which accepts feedback of the d and q axes components of the output voltage of the output filter and controls the instantaneous value of the output voltage of the output filter wherein;
   the sum of the current value to be applied to the load and the current value required to compensate deviation between the output voltage of the filter and a desired voltage command are applied for each of d and q components as the current command of said d and q current minor loop.

2. A controller for the 3-phase converter according to claim 1, wherein the d and q axes components of predicted load current are used as said current value to be applied to the load.

3. A controller for the 3-phase converter according to claim 1, wherein the d and q axes components of predicted load current are used as said current value to be applied to the load, and a second-order prediction is conducted based on present and past values of load current in order to obtain a predicted value of load current.

4. A controller for the 3-phase converter according to claim 1, wherein a sampled data control system is used as said current minor loop and a finite time settlement control system is formed on the basis of an output voltage of the converter, output current of the converter, detected value or predicted value of load current and a converter output current command value.

5. A controller for the 3-phase converter according to claim 1, wherein a sampled data control system is used as said voltage major loop to obtain a current signal required to compensate deviation of output voltage of the converter and a finite time settlement control system is formed on the basis of a sine wave voltage reference and detected value of voltage of the output filter.

6. A controller for the 3-phase converter according to claim 1, wherein said output filter includes parallel capacitors and the current command value of d and q axes components of current to be applied to said parallel capacitors is applied to the curent minor loop.

7. A controller for the 3-phase converter according to claim 1, wherein said converter is formed by an inverter.

8. A controller for the 3-phase converter according to claim 1, wherein said converter is formed by a cycloconverter.

9. A controller for the 3-phase converter according to claim 1, wherein said converter is formed as a reversible converter to convert AC power to DC power or DC power to AC power.

10. A sampled data controller which comprises a 3-phase converter to convert power to a desired frequency by an ON-OFF control of electric valves and controls the output current to be applied to a load through inductances;
   a controller for the 3-phase converter which comprises a current control circuit which accepts feedback of the d and q components of the output current of said converter and controls an instantaneous value of output current of the converter, wherein products of respective values of the d axis and q axis components of voltage applied to the inductances, and a value corresponding to the output frequency and sampling period of the converter is used as decoupling signal is applied in positive polarity to the q axis signal of the current control circuit while the q axis component of such decoupling signal is applied in negative polarity to the d axis signal of the current control circuit.

11. A controller for the 3-phase converter according to claim 10, wherein tan ($\pi$fT) is used as a value corresponding to the output frequency (f) and sampling period (T) of the converter.

12. A controller for the 3-phase converter according to claim 10, wherein $\pi$fT is used as a value in relation to the output frequency (f) and sampling period (T) of the converter.

* * * * *

UNITED STATES PATENT AND TRADEMARK OFFICE
CERTIFICATE OF CORRECTION

PATENT NO. : 4,823,251
DATED : April 18, 1989
INVENTOR(S) : TAKAO KAWABATA ET AL.

It is certified that error appears in the above-identified patent and that said Letters Patent is hereby corrected as shown below:

Front Page, Col. 1, [54], line 1, after "FOR" insert --CONTROLLING--.
Col. 1, line 1, after "FOR" insert --CONTROLLING--.
Col. 3, line 44, "up down" should be --up/down--.
Col. 4, line 23, delete "and" and insert --,--.

Col. 5, line 33, before ";" insert -- $\wedge$ --.

Col. 6, line 9, before "=" insert -- $D$ --;

Col. 6, line 17, "as  ,  ." should be --$\widehat{V}$, $\widehat{I}$.--;

Col. 6, line 30, before "=" insert -- $\widehat{V}$ --;

Col. 6, line 35, before "=" insert -- $\widehat{I}$ --.

UNITED STATES PATENT AND TRADEMARK OFFICE
CERTIFICATE OF CORRECTION

PATENT NO. : 4,823,251
DATED : April 18, 1989
INVENTOR(S) : TAKAO KAWABATA ET AL.

It is certified that error appears in the above-identified patent and that said Letters Patent is hereby corrected as shown below:

Col. 7, line 33, " $\dot{I}_A - \dot{I}_L$ " should be -- $\widehat{\mathbb{I}}_A - \widehat{\mathbb{I}}_L$ --.

Col. 8, line 67, "K" (both occurrences) should be -- $\mathbb{K}$ --.

Col. 9, line 57, equation $$\dot{I}_A = \dot{I}_C + \dot{I}_L{}^* + \dot{J}_C$$

should be --

$$\widehat{\mathbb{I}}_A = \widehat{\mathbb{I}}_C{}^* + \widehat{\mathbb{I}}_L{}^* + \widehat{J}_C$$

Col. 10, line 58, after "mark" insert -- ○ --.

Signed and Sealed this

Thirtieth Day of October, 1990

Attest:

HARRY F. MANBECK, JR.

*Attesting Officer*     *Commissioner of Patents and Trademarks*